United States Patent [19]

Fernandez

[11] Patent Number: 5,413,035
[45] Date of Patent: May 9, 1995

[54] STEERING WHEEL SUPPORTED TRAY

[76] Inventor: Eugene Fernandez, 460 Old Town Rd. No. 13G, Port Jsfferson Station, N.Y. 11776

[21] Appl. No.: 120,673

[22] Filed: Sep. 13, 1993

[51] Int. Cl.⁶ .............................................. A47B 23/00
[52] U.S. Cl. ....................................... 108/44; 108/25; 108/24
[58] Field of Search ................... 108/44, 45, 25, 26; 224/276

[56] References Cited

U.S. PATENT DOCUMENTS

| | | | |
|---|---|---|---|
| 2,314,550 | 3/1943 | Olman | 108/44 |
| 2,584,006 | 1/1952 | Finger | 108/44 X |
| 2,717,816 | 9/1955 | Turner | 108/45 |
| 3,643,606 | 2/1972 | Vise | 108/44 |
| 3,899,982 | 4/1975 | Fetzek | 108/45 |
| 4,747,352 | 5/1988 | Guidry et al. | 108/26 X |
| 4,940,003 | 7/1990 | Mayhew et al. | 108/25 X |
| 5,106,003 | 4/1992 | Ma | 108/44 X |
| 5,177,665 | 1/1993 | Frank et al. | 108/44 X |
| 5,188,421 | 2/1993 | Arseneault | 108/44 X |

FOREIGN PATENT DOCUMENTS

| | | | |
|---|---|---|---|
| 1550899 | 8/1979 | United Kingdom | 108/44 |
| 2144627 | 3/1985 | United Kingdom | 108/44 |

Primary Examiner—Jose V. Chen
Attorney, Agent, or Firm—Michael I. Kroll

[57] ABSTRACT

A tray supported on a steering wheel of a motor vehicle is provided and consists of a back panel, with a base panel secured along one inner edge to a lower edge of the back panel. A structure is for attaching in a removable manner, the back panel to the steering wheel. The base panel will generally extend horizontally and outwardly therefrom, to allow a person sitting on a seat in the motor vehicle to eat off of and work upon the base panel.

11 Claims, 3 Drawing Sheets

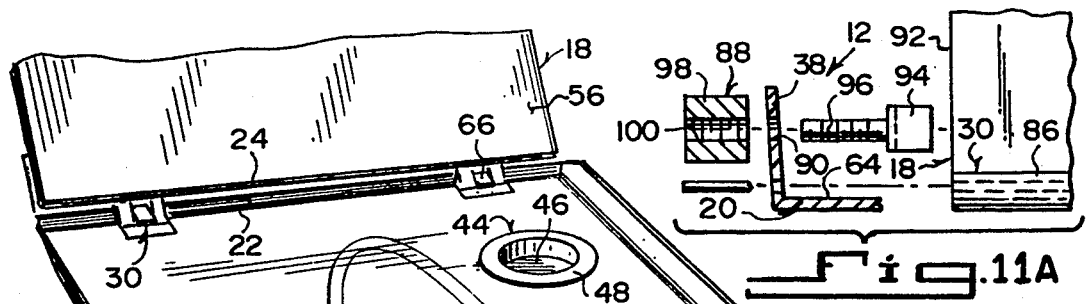
Fig. 6 (OPTIONAL PULL OUT TRAY)
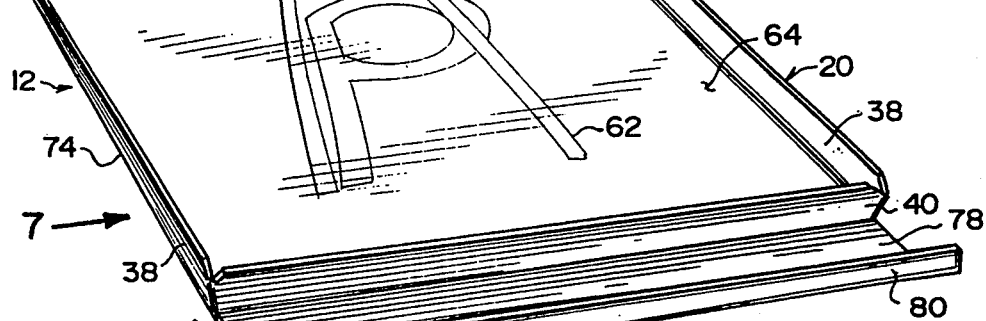
Fig. 11A
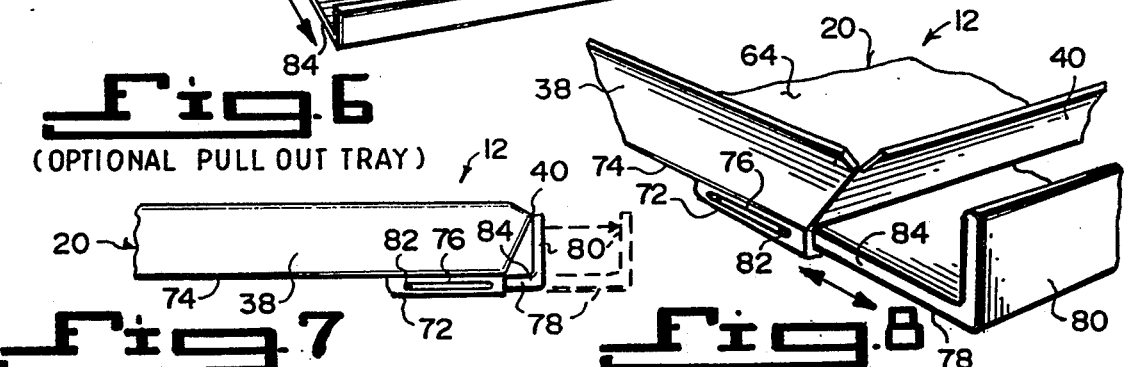
Fig. 7
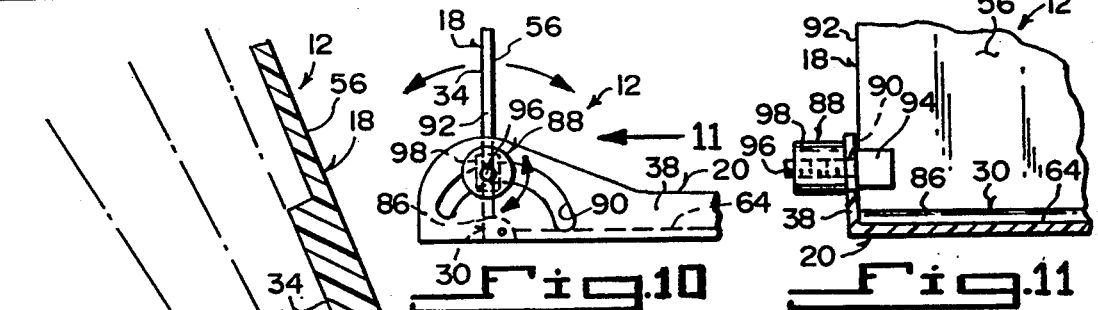
Fig. 8
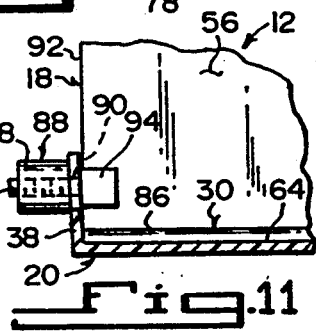
Fig. 10
Fig. 11
VARIED STEERING WHEEL ANGLES
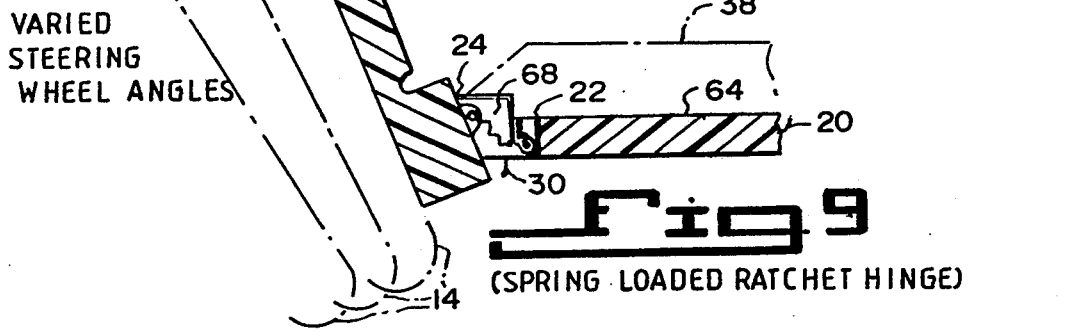
Fig. 9 (SPRING LOADED RATCHET HINGE)

STEERING WHEEL SUPPORTED TRAY

BACKGROUND OF THE INVENTION

1. Field of the Invention

The instant invention relates generally to automotive utility devices and more specifically it relates to a steering wheel supported tray.

2. Description of the Prior Art

Numerous automotive utility devices have been provided in prior art. For example U.S. Pat. Nos. 2,299,025 to McGinley; 2,746,821 to Schroeder; 2,856,251 to Garrison; 3,051,539 to Montgomery; 3,556,589 to Messier; 4,890,559 to Martin; 4,915,035 to Clark et al.; 4,974,805 to Douglas; 4,995,637 to Muraish; 5,046,433 to Kramer et al.; 5,060,581 to Malinski; 5,106,003 to Ma and 5,193,777 to Faulstich all are illustrative of such prior art. While these units may be suitable for the particular purpose to which they address, they would not be as suitable for the purposes of the present invention as heretofore described.

McGINLEY, WILLIAM L.

STEERING WHEEL TRAY

U.S. Pat. No. 2,229,025

A service tray for use on vehicle steering wheels having rims in a plane angularly of the horizontal is provided. A receptacle oppositely disposed U-shaped members in a transversely spaced relation are on the receptacle and extend at the rear thereof with the arms of the U of each member extending outwardly in a direction transversely away from the other member. The U-shaped members being engageable downwardly with the inner potions of the U's against spaced points on the inner periphery of a steering wheel rim. The weight of the receptacle causes the oppositely disposed arms of each U to be bindingly engaged with opposite sides of the rim to hold the receptacle thereon.

SCHROEDER, FLORENCE MARGARET

AUTOMOBILE STEERING WHEEL TABLE

U.S. Pat. No. 2,746,821

An automobile service table includes a transversely elongated horizontal panel, and a structure for removably mounting the panel on automobile steering wheels of various diameters. The structure comprises a substantially C-shaped, resilient clamp fixedly mounted on the front edge of the panel adjacent one end thereof and engageable with the rim of the wheel. A substantially U-shaped clip is mounted for sliding adjustment on the front marginal portion of the panel adjacent the other end thereof and has transverse slots in its leg portions. A substantially C-shaped, resilient clamp is fixed on the bight portion of the clip and is engageable with the wheel rim. A vertical bolt extends through the panel and is engaged in the slots. A wing nut is threaded on the bolt for frictionally securing the clip in an adjusted position on the panel. A leg is pivotally suspended beneath the rear portion of the panel. A substantially C-shaped, resilient clamp on the free end of said leg is engageable with the rim for supporting the panel in a substantially horizontal position thereon in conjunction with the first and second named clamps.

GARRISON, BEATRICE

ADJUSTABLE TRAY FOR AUTOMOBILE STEERING WHEEL

U.S. Pat. No. 2,856,251

An adjustable tray assembly comprises a tray, a pair of upwardly extending brackets fastened to opposite sides of the tray, and a hanger adapted to receive the upper ends of the brackets. The upper end of the hanger is bent to fit around and be suspended from a steering wheel. The hanger has a pair of depending tubular legs in which the upper ends of the brackets are received. The lower end of each leg has a fitting secured thereto. A transverse tube extends between the fittings. A pair of rods are enclosed in the transverse tube. A structure biases the rods outwardly into the fittings, to engage and restrain movement of the hangers. A retracting component is to retract the rods from engagement with the hangers.

MONTGOMERY, HENRY M.

TRUCK DRIVER'S DAILY LOG BOOK HOLDER

U.S. Pat. No. 3,051,539

In accordance with the invention, a housing has been provided which can be secured to the top of the inside of the cab of the truck. The housing is preferably divided into compartments or sections, in which a folding desk-like structure, a shelf and a clipboard are stored. A folding lid on the box-like housing provides easy access to the sections for removal of the articles therein.

MESSIER, ALBERT J.

COMBINATION SNACK TRAY AND BACKREST

U.S. Pat. No. 3,556,589

A combination device that is usable as a snack tray or backrest on the front seat of an automobile having a seat portion and a back portion. A first frame member includes a wall that is receivable in flush engagement with the back portion of the front seat and that extends substantially the full height thereof. a structure is for mounting the first frame member on the back portion. A second frame member is hingedly secured to the bottommost edge of the first frame member and has a configuration generally corresponding to the first frame member so as to enclose the first frame member when the device is used as a backrest. The second frame member includes a tray panel at the inner surface and a panel on the outer surface of which a rest portion is formed that an occupant leans against when the device is used as a backrest and that engages the seat portion of the front seat when the second frame member is unlocked from the first frame member and is pivoted downwardly therefrom. The seat portion supports the second frame member in a substantially horizontal position. The first frame member mounting structure includes spaced supporting members that are connectable to the first frame member and that extend upwardly therefrom for engagement with the top of the back portion of the front seat. A component is for adjusting the supporting members relative to the first frame member, so as to locate the hinged axis of the frame members in that position that will enable the tray panel of the second frame member to be horizontal when the second frame member is hingedly moved to the open position on the seat portion.

MARTIN, GAIL E.
STEERING WHEEL TABLE
U.S. Pat. No. 4,890,559

A table device mountable upon a steering wheel. The device includes a box-like structure provided with a bottom opening for placement over and reception of a steering wheel. A table pivotally engages the box-like structure. A pair of laterally disposed support legs pivotally engages the table. A latch for holding the table at a selected angle relative to the box-like structure and hence the steering wheel. The device folds into a compact unit for storage.

CLARK, BOBBY D.
MC MILLAN, SHIRLEY
AUTOMOBILE FOOD SERVICE TRAY
U.S. Pat. No. 4,915,035

A novel compact rigid food serving tray horizontally attached to an automobile steering wheel at any elevation regardless of the steering wheels inclination to the vertical. The tray being supported on the steering wheel by two right angle frames slideably engaging longitudinal slots on each side of the bottom of the tray. The transverse portions of the frames inwardly turned towards each other and having a structure for adjusting the spacing therebetween. A leakproof beverage container well is located on the front center of the tray for holding cans, bottles, glasses and so forth.

DOUGLAS, CAMERON F.
CLIPBOARD FOR STEERING WHEEL
U.S. Pat. No. 4,974,805

A clipboard for removably mounting on the steering wheel of a vehicle, as well as a boat. The clipboard includes a flat support plate provided with a top flange having a slot for receiving a top segment of the steering wheel and a bottom flange terminating the bottom end of the plate for engaging a bottom portion of the steering wheel. A center clip is attached to the upper center portion of the support plate and one or more side clips can also be secured to the support plate on one or both sides of the center clip or elsewhere on the support plate, as desired.

MURAISHI, NOBORU
MOTOR VEHICLE WORK PLATFORM
U.S. Pat. No. 4,995,637

A work platform for mounting on the steering wheel of a motor vehicle is disclosed. The platform has a generally flat underside and a top side which defines a generally flat writing surface. The platform also includes a securing structure for engaging the outer rounded edge of a steering wheel to mount the work platform on the steering wheel.

KRAMER, RANDAL
KRAMER, MARY
ADJUSTABLE FOLDING TRAY APPARATUS FOR ATTACHMENT TO A VEHICLE SEAT BACK
U.S. Pat. No. 5,046,433

An adjustable folding table apparatus for attachment to a seat back for use primarily within an automobile or other vehicle. It includes a tray portion rotatable between a substantially vertical stored position and a substantially horizontal extended position, suspended from a portion of the seat back. A series of flexible straps are employed, to enable both facilitated attachment and detachment of the apparatus from the seat back, as well as adjustment of the vertical and/or angular orientation of the tray apparatus. A latch or catch serves to retain the tray portion in a folded up or stored position until it is dislodged.

MALINSKI, CAROLE S.
STEERING WHEEL TRAY APPARATUS
U.S. Pat. No. 5,060,581

A foldable stowable portable steering wheel mounted tray apparatus of inexpensive construction permits the automobile driver to comfortably dine while seated behind the steering wheel. The tray apparatus provides a tray surface on which to dispose food and to prop reading material in an upright position. Adjustments are provided for accommodating the tray to the angular orientation between the steering wheel column and the horizontal, the tilt angle, as differs between various models of automobiles, to maintain the tray level. The tray is pivotally mounted along a longitudinal edge to a back panel that in turn is supported on the steering wheel. Straps extending from the back panel to the tray suspend the opposed end of the tray maintaining same to a level position. Angular adjustment is achieved by changing the length of restraining straps. A brass brad is inserted through slits in the strap to bunch together a portion of the strap's end, thereby adjusting the length of the remainder of the strap.

MA, MARK
VEHICLE TRAY TABLE
U.S. Pat. No. 5,106,003

A tray includes a flat horizontal surface, positioned within a frame, with the frame tray adaptable to be positioned atop the dashboard of a vehicle, such as an automobile. There is further provided an attachment of one end of the tray to the windshield via suction cups, and for providing a second pair of suction cups which are adjustable in height to be attachable onto the dashboard, so that the tray can be supported flat during use. There may be further included a trash bag support bracket, and holders for receiving a cup thereinto to maintain the cup in a vertically supported position on the tray.

FAULSTICH, EUGENE W.
NOTE-MAP HOLDER
U.S. Pat. No. 5,193,777

A map-note holder for attachment to an automobile steering wheel. The map-note holder is a flexible, elastic support strap which can be stretched across the steering wheel and tied thereto. The map holder has a plastic structure, for holding a map and has a movable light component for showing light directly on the map. For storage, it can easily be removed, folded up and stored in the glove compartment, or the like.

SUMMARY OF THE INVENTION

A primary object of the present invention is to provide a steering wheel supported tray that will overcome the shortcomings of the prior art devices.

Another object is to provide a steering wheel supported tray that contains a back panel which is attached in a removable manner to the steering wheel and a base panel extending horizontally outwardly from the back panel.

An additional object is to provide a steering wheel supported tray in which a person sitting on a vehicle seat can use the base panel to eat off of and/or work upon.

A further object is to provide a steering wheel supported tray that is simple and easy to use.

A still further object is to provide a steering wheel supported tray that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 6 is a front perspective view with parts broken away of a first modification showing a pull out tray in the base panel.

FIG. 7 is a side view of a portion thereof taken in the direction of arrow 7 in FIG. 6.

FIG. 8 is an enlarged front perspective view of a corner thereof.

FIG. 9 is a side cross sectional view with parts broken away of a second modification, showing a spring loaded ratchet hinge for varied steering wheel angles.

FIG. 10 is a side view with parts broken away of a third modification, so as to change and retain the angle between the back panel and base panel, to compensate for the varied steering wheel angles.

FIG. 11 is a front view taken in the direction of arrow 11 in FIG. 10.

FIG. 11A is an exploded front view showing the various components of the third modification.

DETAILED DESCRIPTION OF THE PREFERRED EMBODIMENTS

Figure 1:
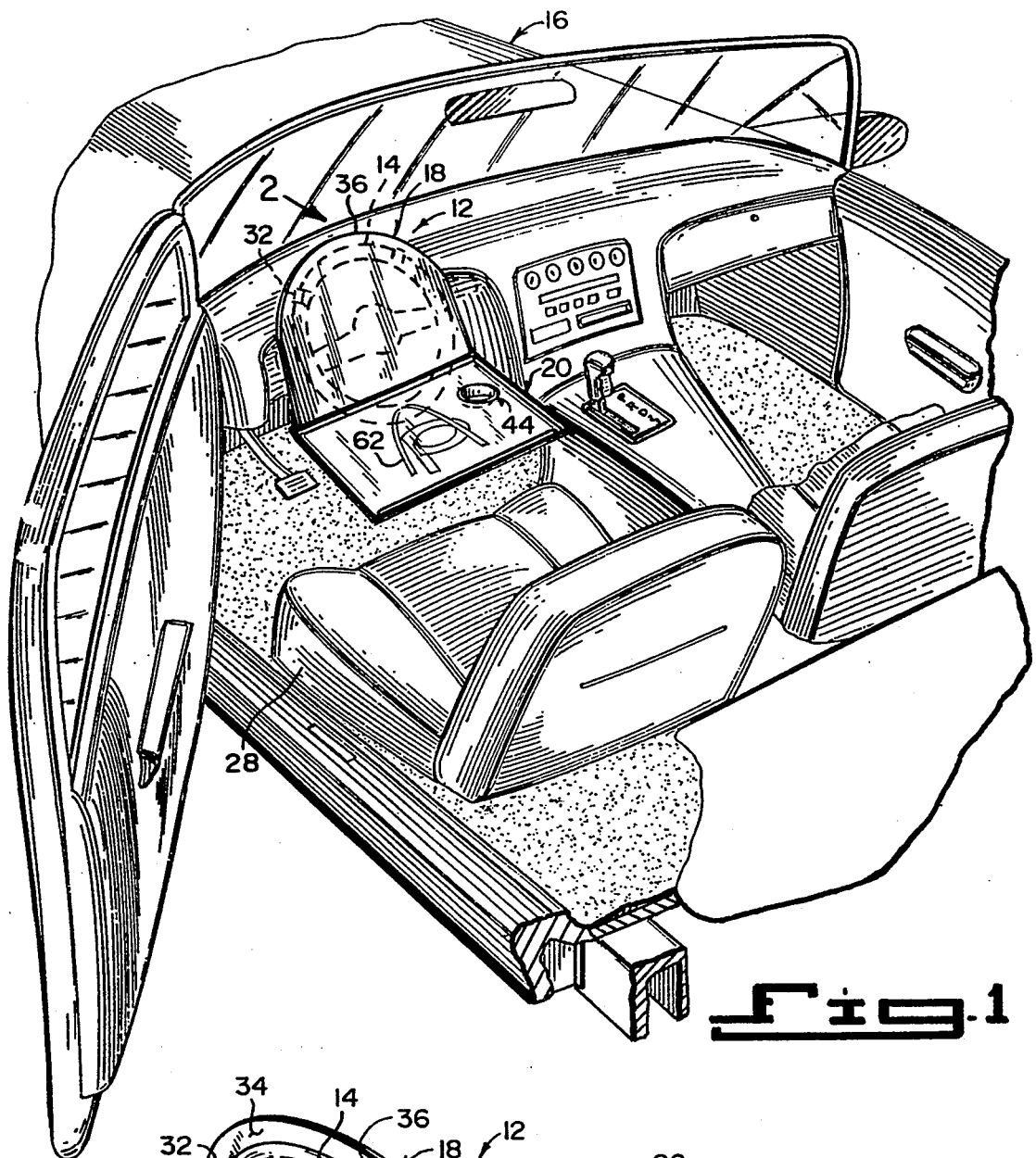
FIG. 1 is a front perspective view of the instant invention installed on a steering wheel of a motor vehicle with parts broken away.
Figure 2:
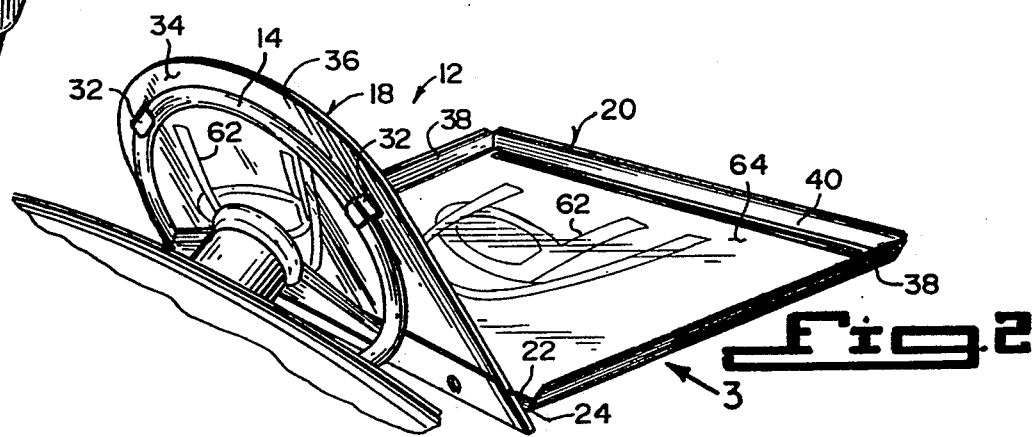
FIG. 2 is a rear perspective view taken in the direction of arrow 2 in FIG. 1, showing part of the dashboard and steering wheel.
Figure 4:
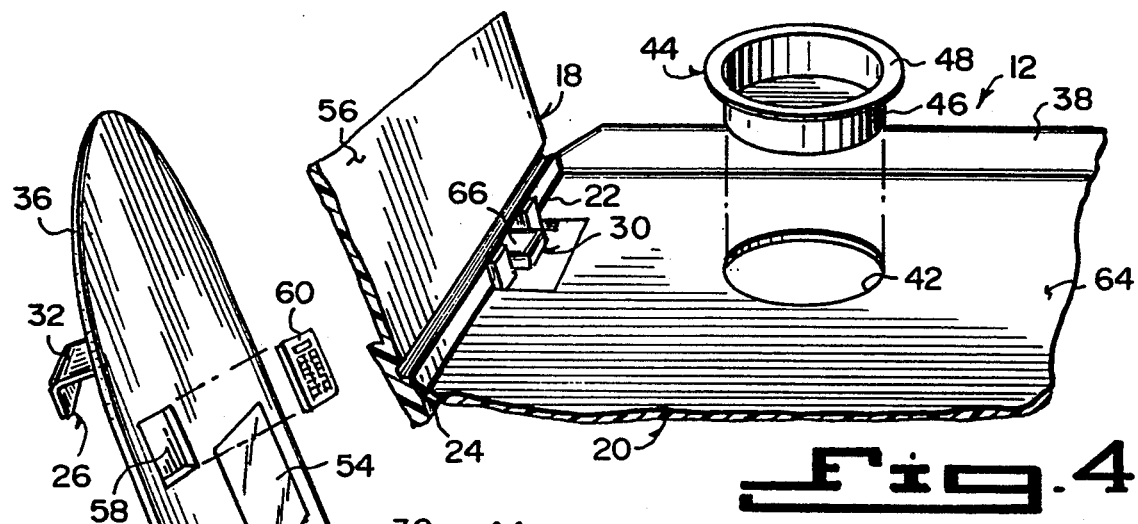
FIG. 4 is an enlarged side perspective view of a portion thereof, showing the beverage container holder exploded therefrom.

Turning now descriptively to the drawings, in which similar reference characters denote similar elements throughout the several views, FIGS. 1 through 11A illustrate a tray 12 supported on a steering wheel 14 of a motor vehicle 16, consisting of a back panel 18, with a base panel 20 secured along one inner edge 22 to a lower edge 24 of the back panel 18. A structure 26 is for attaching in a removable manner, the back panel 18 to the steering wheel 14. The base panel 20 will generally extend horizontally and outwardly therefrom, to allow a person sitting on a set 28 in the motor vehicle 16 to eat off of and work upon the base panel 20.

A mechanism 30 is for pivotally engaging the one inner edge 22 of the base panel 20 to the lower edge 24 of the back panel 18, to permit relative pivotal movement between the back panel 18 and the base panel 20, so as to pivot between a folded position and an open position.

The removable attaching structure 26 is a pair of hooks 32, spaced apart and affixed to a rear surface 34 of the back panel 18, to engage with the steering wheel 14. An upper edge 36 of the back panel 18 is curved to conform to the curvature of the steering wheel 14.

The base panel 20 contains a pair of upwardly extending side walls 38 and an upwardly extending front wall 40, to prevent any article placed upon the base panel 20 from falling off. The base panel 20 has a circular aperture 42 therethrough. A beverage container holder 44 is provided, having a cup portion 46 and a flat annular flange portion 48. The cup portion 46 can fit into the circular aperture 42 with the annular flange portion 48 resting upon the base panel 20.

Figure 3:
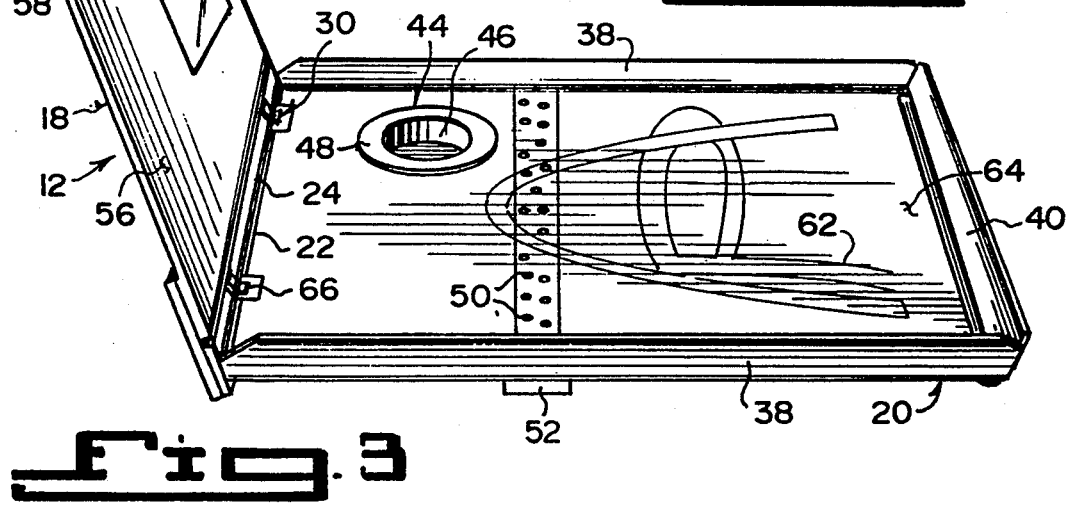
FIG. 3 is a side perspective view of the instant invention per se taken in the direction of arrow 3 in FIG. 2.
Figure 5:
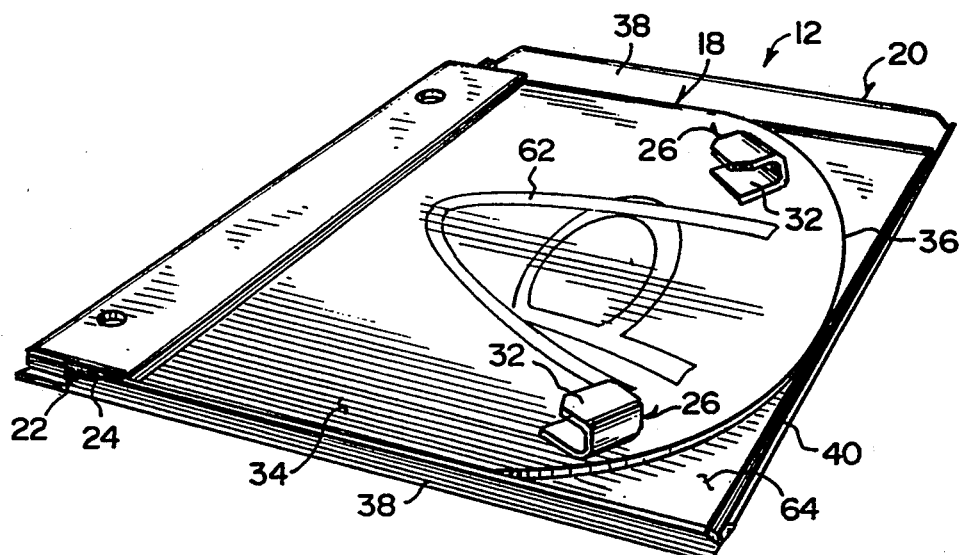
FIG. 5 is a side perspective view showing the instant invention in a closed position.

As shown in FIG. 3, the base panel 20 can have a plurality of small drain holes 50 thereacross. A sump member 52 is mounted to the underside 54 of the base panel 20 directly under the drain holes 50, so that any liquid spilled onto the base panel 20 will enter the sump member 52. A mirror 54 can be affixed to a front surface 56 of the back panel 18, so that a person can look into the mirror 54.

A recessed portion 58 can be formed into the front surface 56 of the back panel 18, so that a calculator 60 and similar article can be retained within the recessed portion 58, to be operable by a person. Any type of logo 62 can be printed on the front surface 64 of the base panel 20 and on the rear surface 34 of the back panel 18, to be used for business advertising.

The pivotally engaging mechanism 30 can be a pair of spaced apart hinges 66 between the one inner edge 22 of the base panel 20 and the lower edge 24 of the back panel 18. The hinge in FIG. 9, is a spring loaded ratchet hinge 68 to compensate for varied steering wheel angles, so that the base panel 20 will always generally extend horizontally and outwardly therefrom.

FIGS. 6, 7 and 8 show an auxiliary pull out tray 70 on the base panel 20, so as to increase the size thereof. The auxiliary pull out tray 70 consists of a track 72 mounted across a rear surface 74 of the base panel 20, adjacent to the front wall 40 in which the track 72 has at least one side slot 76. A plate 78 is provided having an upstanding front flange 80. The plate 78 is inserted into the track 72 in an adjustable manner. At least one stop pin 82 extends from one side 84 of the plate 78, to ride within the side slot 76 in the track 72, to prevent the accidental removal of the plate 78 from the track 72.

As shown in FIGS. 10, 11 and 11A, the pivotally engaging mechanism 30 includes an elongate hinge 86 between the one inner edge 22 of the base panel 20 and the lower edge 24 of the back panel 18. An assembly 88 is for changing and retaining the angle between the back panel 18 and the base panel 20, to compensate for the varied steering wheel angles.

The changing and retaining assembly 88 consists of each side wall 38 of the base panel 20 having a curved slot 90 adjacent a side edge 92 of the back panel 18. A pair of clamps 94 are provided, with each having a threaded shaft 96. Each clamp 94 is attached to one of the side edges 92 of the back panel 18, so that each threaded shaft 96 will extend through each curved slot 90. A pair of knobs 98 are also provided, with each having a threaded aperture 100, to thread onto one threaded shaft. When the knobs 98 are loosened, the base panel 20 can pivot. When the knobs 98 are tightened, the base panel 20 will be held in position.

LIST OF REFERENCE NUMBERS 12 tray
14 steering wheel
16 motor vehicle
18 back panel
20 base panel
22 inner edge of 20
24 lower edge of 18
26 removable attaching structure
28 seat in 16
30 pivotally engaging mechanism
32 hook
34 rear surface of 18
36 curved upper edge of 18
38 side wall of 20
40 front wall of 20
42 circular aperture in 20
44 beverage container holder
46 cup portion of 44
48 annular flange portion of 44
50 drain hole
52 sump member
54 mirror
56 front surface of 18
58 recessed portion in 56
60 calculator
62 logo
64 front surface of 20
66 hinge
68 spring loaded ratchet hinge
70 auxiliary pull out tray
72 track
74 rear surface of 20
76 side slot in 72
78 plate
80 upstanding front flange on 78
82 stop pin
84 side of 78
86 elongate hinge
88 changing and retaining assembly
90 curved slot in 38
92 side edge of 18
94 clamp
96 threaded shaft on 94
98 knob
100 threaded aperture in 98

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and is desired to be protected by Letters Patent is set forth in the appended claims:

1. A tray supported on a steering wheel of a motor vehicle comprising:
   a) a back panel, said back panel having an upper edge being curved to conform to the curvature of the steering wheel;
   b) a base panel secured along one inner edge to a lower edge of said back panel, said base panel including a pair of upwardly extending side walls, an upwardly extending front wall to prevent any article placed upon said base panel from falling off, a circular aperture therethrough, a beverage container holder having a cup portion and a flat annular flange portion, so that said cup portion can fit into said circular aperture with said annular flange portion resting upon said base panel, a plurality of small drain holes thereacross, and a sump member mounted to the underside of said base panel directly under said drain holes, so that any liquid spilled onto said base panel will enter said sump member;
   c) means for attaching in a removable manner said back panel to the steering wheel, so that said base panel will generally extend horizontally and outwardly therefrom, to allow a person sitting on a seat in the motor vehicle to eat off of and work upon said base panel, said removable attaching means including a pair of hooks spaced apart and affixed to a rear surface of said back panel, to engage with the steering wheel; and
   d) means for pivotally engaging the one inner edge of said base panel to the lower edge of said back panel, to permit relative pivotal movement between said back panel and said base panel, so as to pivot between a folded position and an open position.

2. A tray as recited in claim 1, further including a mirror affixed to a front surface of said back panel, so that a person can look into said mirror.

3. A tray as recited in claim 1, further including a recessed portion formed into a front surface of said back panel, so that a calculator and similar article can be retained within said recessed portion to be operable by a person.

4. A tray as recited in claim 1, further including any type of logo which can be printed on a front surface of said base panel and on a rear surface of said back panel to be used for business advertising.

5. A tray as recited in claim 1, wherein said pivotally engaging means includes a pair of spaced apart hinges between the one inner edge of said base panel and the lower edge of said back panel.

6. A tray as recited in claim 5, wherein each said hinge is a spring loaded ratchet hinge to compensate for varied steering wheel angles, so that said base panel will always generally extend horizontally and outwardly therefrom.

7. A tray as recited in claim 1, further including an auxiliary pull out tray on said base panel, so as to increase the size thereof.

8. A tray as recited in claim 7, wherein said auxiliary pull out tray includes:
   a) a track mounted across a rear surface of said base panel adjacent to said front wall, said track having at least one side slot;
   b) a plate having an upstanding front flange, said plate inserted into said track in an adjustable manner; and
   c) at least one stop pin extending from one side of said plate to ride within said side slot in said track to prevent the accidental removal of said plate from said track.

9. A tray as recited in claim 1, wherein said pivotally engaging means includes an elongate hinge between the one inner edge of said base panel and the lower edge of said back panel.

10. A tray as recited in claim 9, further including means for changing and retaining the angle between said back panel and said base panel, to compensate for the varied steering wheel angles.

11. A tray as recited in claim 10, wherein said changing and retaining means includes:
   a) each said side wall of said base panel having a curved slot adjacent a side edge of said back panel;
   b) a pair of clamps, each having a threaded shaft, whereby each said clamp is attached to one of the side edges of said back panel, so that each said threaded shaft will extend through each said curved slot; and
   c) a pair of knobs, each having a threaded aperture to thread onto one said threaded shaft, so that when said knobs are loosened, said base panel can pivot and when said knobs are tightened, said base panel will be held in position.

* * * * *